UNITED STATES PATENT OFFICE.

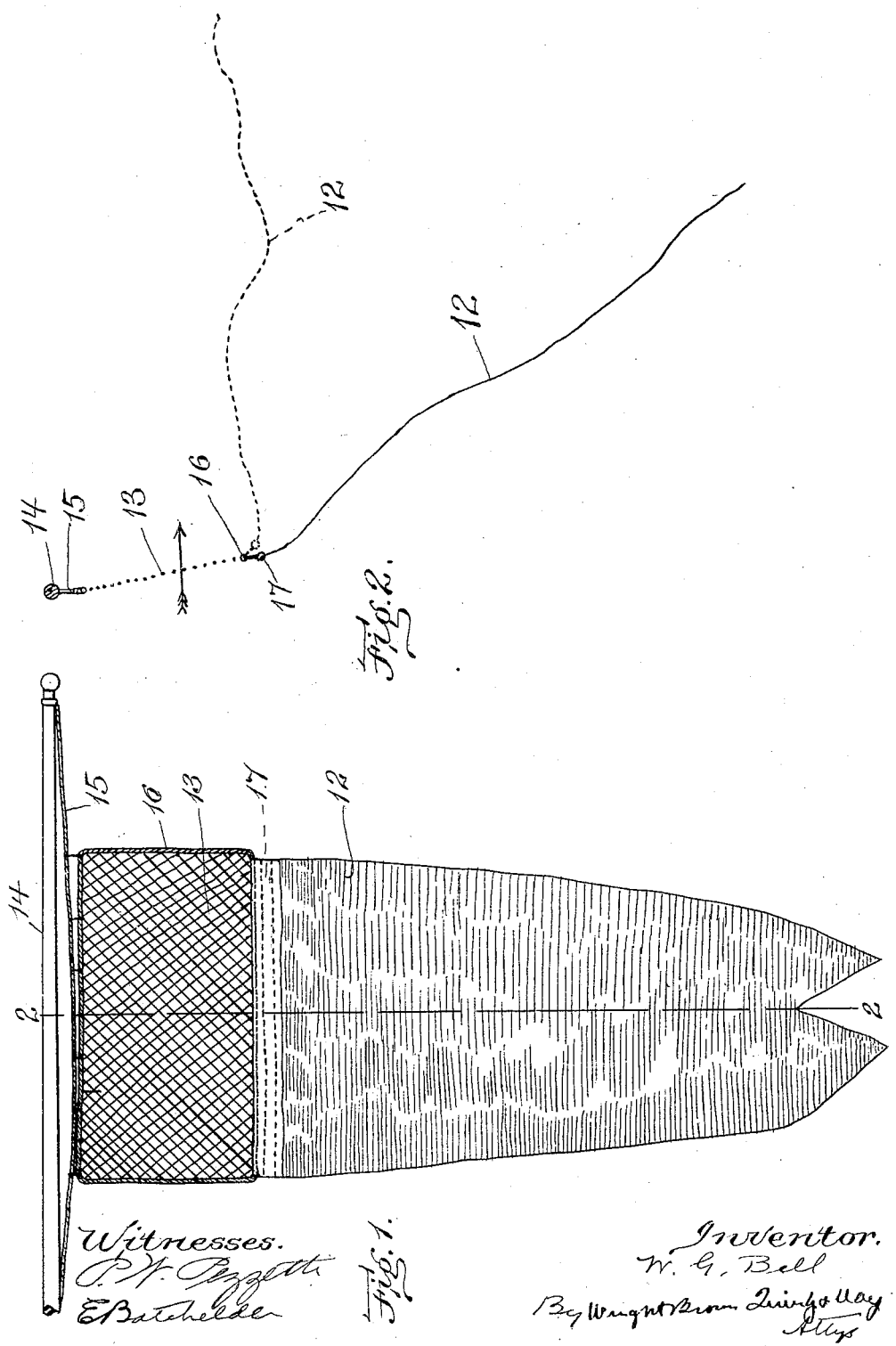

WILLIAM G. BELL, OF NEWTON, MASSACHUSETTS.

FLAG.

No. 916,979.  Specification of Letters Patent.  Patented April 6, 1909.

Application filed October 3, 1908. Serial No. 456,033.

*To all whom it may concern:*

Be it known that I, WILLIAM G. BELL, of Newton, in the county of Middlesex and State of Massachusetts, have invented certain new and useful Improvements in Flags, of which the following is a specification.

This invention relates to a flag adapted to be suspended from a substantially horizontal overhead support, such as a rope extending across a street or a pole projected from the side of a building.

The invention has for its object to prevent the flag from being fouled with the overhead support by its movements caused by the action of wind. It frequently happens that the lower end portion of a pendent flag is blown upwardly by the wind and deposited upon the overhead support, or is, in other words, fouled with the support, so that the usefulness of the flag is impaired until it is disengaged so that it may hang freely.

My invention has for its object to provide a flag of such construction that the wind will blow freely through its upper portion and prevent its main or body portion from rising far enough above the overhead support to become fouled therewith.

The invention consists in the improvements which I will now proceed to describe and claim.

Of the accompanying drawings, forming a part of this specification,—Figure 1 represents a side view of a flag embodying my invention, and Fig. 2 represents a section on line 2—2 of Fig. 1, illustrating the action of the wind on the flag.

The same reference characters indicate the same parts in both figures.

In the embodiment of my invention here shown, for the purpose of illustrating the same, 12 represents the body or main portion of a flag, said portion being preferably constructed of textile fabric, such as bunting or other suitable material, the entire area of the body portion being of closely woven texture, so that it is adapted to be freely moved by the pressure of wind against it and presents continuous practically opaque surfaces. The body portion 12 occupies the greater part of the area of the flag, and it is supplemented by an end portion 13 which constitutes the inner or upper end portion of the flag, and is adapted to be secured to an overhead support, such as a pole 14, a rope 15 being here shown to which the portion 13 is connected. Said rope may be the sole support of the flag or it may be secured adjustably or otherwise to the pole 14. The end portion 13 is constructed to permit the free passage of wind through it, so that when the flag is in use, the wind blowing against one side of the flag will displace the body portion which is of relatively close texture, causing the same to wave, as indicated by full and dotted lines in Fig. 2, the wind at the same time passing freely through the end portion 13, the displacement of which by the said pressure is reduced to the minimum owing to the open construction of said end portion. The wind passing through the end portion 13 prevents the body portion from rising or being blown upwardly far enough to fall upon or become fouled with the overhead support. This action is illustrated in Fig. 2 where the arrow represents the direction of wind passing through the end portion 13, and the dotted line represents substantially the maximum height to which the body portion 12 may be carried by the wind pressure. The end portion 13 is preferably a section of open-mesh netting of fibrous material, the margin of the section of netting being secured to a flexible marginal frame 16, preferably composed of rope. One edge of the rope frame 16 is permanently attached to the body portion 12, the opposite edge portion of the frame constituting the upper extremity of the flag and being secured to the overhead support. A transverse stiffener 17 may be applied to the back at the junction of the body portion 12 and end portion 13, said stiffener being a strip of wood or other suitable material. I do not regard this as an essential feature, however, and it may be omitted if desired.

It will be seen that the above described construction provides for the uninterrupted usefulness of a flag suspended from an overhead support and renders unnecessary any care to keep the flag free and in a properly displayed position.

I do not limit myself to the construction nor to the form of the parts of the flag here shown and described, as the form, construction and material may be variously modified without departing from the spirit of the invention.

I claim:

1. A flag composed of a flexible body portion of closely woven texture throughout its entire area, and adapted to be freely moved by wind pressure, and an upper end portion adapted to engage a suspending device, and constructed to permit the free passage of wind through it, whereby the fouling of the body portion with the overhead support with which the end portion is engaged, is prevented, the said end portion being interposed between the body portion and the support.

2. A flag composed of a body portion of closely woven texture throughout its entire area, and adapted to be freely moved by wind pressure, and an upper end portion of open construction adapted to permit the free passage of wind through it for the purpose stated.

3. A flag composed of a body portion of closely woven texture throughout its entire area, and adapted to be freely moved by wind pressure, and an upper end portion composed of open mesh netting and having a flexible marginal frame, one side of which is attached to the body portion, the opposite side of said frame constituting the upper extremity of the flag.

4. A flag composed of a body portion of closely woven texture throughout its entire area, and adapted to be freely moved by wind pressure, and an upper end portion composed of open mesh netting and having a flexible marginal frame, one side of which is attached to the body portion, the opposite side of said frame constituting the upper extremity of the flag, and a transverse stiffener secured to the flag at the junction of its body and upper end portions.

In testimony whereof I have affixed my signature, in presence of two witnesses.

WILLIAM G. BELL.

Witnesses:
E. BATCHELDER,
P. W. PEZZETTI.